(12) United States Patent
Parat et al.

(10) Patent No.: US 6,435,733 B1
(45) Date of Patent: Aug. 20, 2002

(54) CONNECTING ASSEMBLY OF OPTICAL FIBERS WITH OPTICAL OR OPTOELECTRONIC COMPONENTS

(75) Inventors: Guy Parat, Claix; Patrice Caillat, Echirolles; Christiane Puget, St Egreve, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/485,289

(22) PCT Filed: Jun. 8, 1999

(86) PCT No.: PCT/FR99/01349
§ 371 (c)(1),
(2), (4) Date: Feb. 7, 2000

(87) PCT Pub. No.: WO99/64907
PCT Pub. Date: Dec. 16, 1999

(30) Foreign Application Priority Data

Jun. 9, 1998 (FR) .............................. 98 07219

(51) Int. Cl.⁷ .............................................. G02B 6/42
(52) U.S. Cl. ........................... 385/88; 385/89; 385/90; 385/137
(58) Field of Search .............................. 385/14, 88–92, 385/136–137

(56) References Cited

U.S. PATENT DOCUMENTS

| 5,499,312 A | * 3/1996 | Hahn et al. ................. 385/91 |
| 5,627,931 A | 5/1997 | Ackley et al. |
| 5,631,987 A | * 5/1997 | Lasky et al. ................. 385/88 |
| 5,675,684 A | * 10/1997 | Hirataka et al. ............. 385/88 |
| 5,717,803 A | * 2/1998 | Yoneda et al. ............... 385/89 |
| 5,742,720 A | * 4/1998 | Kobayashi et al. .......... 385/89 |
| 5,923,481 A | * 7/1999 | Skidmore et al. ........... 359/819 |
| 6,151,173 A | * 11/2000 | Massit et al. ............... 359/811 |

FOREIGN PATENT DOCUMENTS

FR  2 757 276  12/1996

OTHER PUBLICATIONS

Sasaki et al., US Patent Application Publication 20010033718 A1.*
U.S. Ser. No. 09/319,269, Corresponds to European Pat. No. 2,757,276 referenced above.
Soldering Technology for Optoelectronic Packaging, Qing Tan and Y.C. Lee, 1996 Electronic Components and Technology Conference, pp 26–36.
Passive Alignment for Optoelectronic Components, Paul O. Haugsjaa, EEP–vol. 19–1, Advances in Electronic Packaging—1997 vol. 1, ASME 1997, pp 753–758.
Silicon Motherboards for Multichannel Optical Modules, Anton Ambrosy, Horst Richter, Jorg hehmann, and Dieter Ferling, IEEE Transactions on Components, Packaging, and Manufcturing Technology—Part A. vol. 19 No. 1, Mar. 1996, pp 33–40.
Flip–chip Optical Fiber Attachment to a Monolithic Optical Receiver Chip, V. Vusirikala, P.J.S. Heim and M. Dagenais, SPIE vol. 2613, pp 52–58.

* cited by examiner

*Primary Examiner*—Hemang Sanghavi
*Assistant Examiner*—Omar Rojas, Jr.
(74) *Attorney, Agent, or Firm*—Pearne & Gordon LLP (57) ABSTRACT

Assembly allowing for connection of optical fibres with optical or optoelectronic components and process for manufacturing this assembly.

According to the invention, at least one fibre support (4, 6) is formed including, for each fibre (2), a V-shaped housing. The support and the component (32) are attached to a substrate (12) with meltable elements (16, 38) and the fibre is positioned in the housing so as to vertically align the fibre with the component, horizontal alignment being obtained by the melted elements. Application is to microelectronics.

21 Claims, 8 Drawing Sheets

CONNECTING ASSEMBLY OF OPTICAL FIBERS WITH OPTICAL OR OPTOELECTRONIC COMPONENTS

FIELD OF THE INVENTION

This invention concerns an assembly allowing for connection of optical fibres with optical or optoelectronic components and a process for manufacturing this assembly.

The invention has applications in the area of microelectronics, particularly in all cases where optical fibres are to be connected to laser sources or optical modules (for example dividers, multiplexers or sensors) mounted on optoelectronic substrates.

In the case of telecommunications by optical transmission in particular, the invention can be used when a laser diode (or bar of lateral emission laser diodes) must be connected to an optical fibre (or several optical fibres).

STATE OF THE PRIOR ART

In the area of microelectronics, the increase in functioning frequency of electrical systems requires:

designing of new principles of data transmission and particularly paralleling of electric buses allowing for simultaneous transmission of several signals at once and/or use of light through optical wave guide (integrated wave guides or optical fibres) in order to increase the information rate.

These optical wave guides provide very good immunity to electromagnetic disturbances.

In addition, optical transmission requires the making of emission, reception and luminous signal processing modules. Techniques have been developed for this, particularly on glass or silicon in order to provide:

coupling of the optical fibres optical and electrical connections of optoelectronic components electric connection of electronic interface components. The following documents can be consulted:

[1] "Soldering technology for optoelectronic packaging", 1996 Electronic Component and Technology Conference, p. 26 to 6

[2] "Passive alignment for optoelectronic components, Advances in electronic packaging, EFP-vol. 19-1, 1997, vol. 1, p. 753 to 758.

[3] "Silicon motherboards for multichannel optical module", IEEE transactions on components, packaging and manufacturing technology, Part A, vol. 19, no. Mar. 1, 1996, p. 34 to 40.

[4] "Flip-chip optical fibre attachment to a monolithic optical receiver chip", SPIE, vol. 2613, p. 53 to 58.

Each of the assemblies known by documents [1] to [4] is generally in the form of a substrate on which:

optical fibres are connected either facing optical wave guides formed in the substrate or facing laser diodes and/or photodetectors, optoelectronic components inserted in this substrate or placed on its surface are coupled with optical wave guides and/or optical fibres, electronic components addressing or collecting information coming from optoelectronic components are positioned.

The optical fibres and optical or optoelectronic components must be perfectly aligned with each other to minimise optical losses.

The degree of precision sought can be less than 0.5 $\mu$m. Two techniques are primarily used for this.

1) A known technique for active alignment of an optical fibre with a laser diode which ensures alignment by electric measurement with a photodiode in real time.

To do this, the laser diode is supplied and a measurement of the luminous power at the exit of the fibre gives an indication of its alignment relative to the laser diode. Optimisation of the alignment is provided by small movements of this laser diode using mechanical or piezoelectric micro-manipulators. An assembly can then be made by bonding.

This active alignment technique has some drawbacks:

long alignment process the need for mechanical fixing, with glue for example, of the laser diode after alignment and that this fixing must not produce mechanical stresses which could modify the alignment.

2) A passive alignment technique for optical fibres is also know. Its main objective is cost reduction.

If the fibre must be connected in parallel to a substrate in silicon for example, the most widespread connection method at present is the making of a V-shaped cavity in the silicon substrate which acts as a optical micro-bench, for example according to the principle of etching along the preferential crystalline planes (100).

The fibre is fixed and glued to the bottom of the cavity facing an optoelectronic component. This optoelectronic component, if it is brought onto the substrate, is generally mounted head down using the flip-chip technique on metallic links providing electrical continuity, mechanical resistance and thermal evacuation to the substrate.

The optoelectronic component facing the fibre must be in absolute alignment in the three directions in space. The following can be used for this:

very precise equipment allowing for positioning and welding of the component, while holding it on the substrate, with precision on the order of 1 $\mu$m, soldering joints with positioning shims made in the substrate and/or in the component to be assembled, soldering joint elements without shims using the auto-positioning effect linked to the wettability forces of the solder in the liquid phase, the auto-positioning taking place in parallel on the substrate by wetting on the metallic studs and perpendicular to the substrate by control of the volume of the soldering elements.

In addition to the use of V-shaped cavities in the substrate, there is a method for attaching by gluing fibres in an intermediate support in silicon, also etched into a V-shape, and then put on the substrate upside down (see document [4]). The alignment and soldering of the intermediate support is done with precision equipment. The auto-alignment effect in the liquid phase is not used. The rigidity of the fibres and the weight of the unit do not allow this.

When a fibre is connected perpendicularly to a substrate, there is a method for inserting the fibre into a pierced block which is first soldered and mounted by the flip-chip method using the auto-alignment effect in the liquid phase. FIG. 5 of document [1] may be consulted for this subject.

There is a problem in the case of passive alignment of an optical fibre facing an optoelectronic component put onto an interconnection substrate.

When the fibre is attached parallel to the substrate in a V-shaped cavity integrated into this same substrate, the optical positioning of the optoelectronic component facing the fibre must be absolute in the three directions in space.

In a plane parallel to the substrate, the metallic studs made, which are soldered, are perfectly aligned with the V-shaped cavity because they are generated by the same lithographic template. The effect of auto-alignment in the liquid phase of the solder microspheres ensures good positioning of the component facing the fibre.

In a direction perpendicular to the substrate however, control of the height of the optical axes requires, for the fibre, control of the width of the V-shaped cavity (variation of burying of the fibre) and of the optoelectronic component, either a mechanical block or a control of the solder volume. These operations depend on the technological manufacturing variations.

SUMMARY OF THE INVENTION

The purpose of this invention is to define an assembly and its manufacturing process, allowing for very precise passive alignment of one or several optical fibres with one or several optical or optoelectronic components in a relative manner.

This assembly is made using microspheres of a meltable material (solder) on a substrate, which can be an interconnection substrate, which acts as an optical micro-bench.

The meltable material of the microspheres is for example indium or a meltable tin and lead-based alloy or any alloy with a low melting point.

Precisely, this invention concerns firstly an assembly including a substrate and, on this substrate, at least one optical fibre support, at least one optical fibre in the support and at least one optical or optoelectronic component, the optical axis of the fibre and the optical axis of the component being aligned, this assembly being characterised in that the support and the component are attached to the substrate using microspheres of a meltable material, allowing the optical axis of the fibre and the optical axis of the component to be parallel to each other in the same plane perpendicular to a surface of the substrate, and in that the support includes, for each fibre, a V-shaped housing with two walls inclined towards each other, the opening of the "V" being located on the side of the support which is not attached to the substrate, and in that the fibre is positioned in the housing, the volume of each microsphere and the housing being determined so that the optical axis of the fibre and the optical axis of the component are parallel to each other in the same plane parallel to the surface of the substrate.

According to a first particular mode of embodiment of the assembly of the invention, the housing goes through the whole support, this housing thus having two lower edges, the distance separating these two lower edges being determined, given the diameter of the fibre and its supporting points in the housing, so that the optical axis of the fibre and the optical axis of the component are parallel to each other in the same plane parallel to the surface of the substrate.

According to a second particular mode of embodiment, the housing does not go through the support.

This invention also involves a process for manufacturing an assembly including a substrate and, on this substrate, at least one optical fibre support, at least one optical fibre in the support and at least one optical or optoelectronic component, the optical axis of the fibre and the optical axis of the component being aligned, this process being characterised in that the fibre support formed includes, for each fibre, a V-shaped housing with two walls inclined towards each other, the opening of the "V" being located on the side of the support which is not attached to the substrate, and also including several first attaching studs, and in that there are also several first attaching studs on the component, in that second attaching studs are formed on the substrate, these second studs being respectively associated with the first studs, in that there are formed on these first studs and/or second studs, elements made of a meltable material apt to be soldered to the first and second studs, these first and second studs being wettable by this material in the molten state while their environment is not, in that the support and the component are attached to the substrate by the corresponding elements, these elements being melted for this purpose and allowing the optical axis of the fibre and the optical axis of the component to be parallel to each other in the same plane perpendicular to a surface of the substrate, and in that the fibre in positioned in the housing, the volume of each element and the housing being determined so that the optical axis of the fibre and the optical axis of the component are parallel to each other in the same plane parallel to the surface of the substrate.

According to a first mode ("Crossing V") of applying the process of the invention, the housing crosses the whole support, the housing thus having two lower edges, the distance separating these two lower edges being determined, given the diameter of the fibre and its supporting points in the housing, so that the optical axis of the fibre and the optical axis of the component are parallel to each other in the same plane parallel to the surface of the substrate.

According to a second mode of application ("Non-crossing V"), the housing does not go through the support.

The support may include several parallel V-shaped housings with several optical fibres positioned in these housings.

Each fibre may be attached by glue in its corresponding housing.

The glue should preferably be spread between the support and the substrate around the meltable material elements placed on the support to give the assembly greater solidity.

According to a particular mode for applying the invention process, a cap to cover each housing is made and each fibre is pressed against the corresponding housing with this cap and then advantageously attached in the corresponding housing.

This cap may be transparent, allowing for observation of each fibre in its housing and even gluing of this fibre in this housing by hardening of polymerisable glue by radiation (generally ultraviolet radiation) shown on the glue through the cap.

According to a first particular mode for applying the invention process, the cap includes, for each fibre, a protuberance by which this fibre is pressed against the corresponding housing.

According to a second particular mode for applying the invention process, the cap includes a plane side by which each fibre is pressed against the corresponding housing, the fibre going beyond the side of the support which is not attached to the substrate.

According to a particular mode of embodiment of the invention for the "Crossing V", a support is formed from a plate in which at least two V-shaped walls are made by chemical and/or mechanical etching of this plate in order to obtain a determined distance between the two lower edges of each V. The first studs corresponding to the support are formed by a photolithography technique and the two walls of the housing are separated.

In the particular case where the plate is initially too thick, the formation of the support includes a step of thinning the plate done before or after the etching of the V.

According to another particular mode of embodiment of the invention for the "Non-crossing V", a support is formed from a plate in which at least two V-shaped walls are made by chemical and/or mechanical etching of this plate and the first studs corresponding to the support are formed by a photolithography technique.

The first studs corresponding to the component are preferably formed by a photolithography technique.

The second studs corresponding to the component are also preferably formed on the substrate by a photolithography technique.

According to a preferred mode of embodiment for the invention, the elements formed on the two studs all have the same thickness.

The elements formed on the second studs are preferably brought to a molten state, each element taking the form of a sphere. These elements in the form of spheres are then brought to the solid state and then to the molten state to assemble the component and the support with the substrate.

The shape of the spheres depends on the shape of the second studs and is thus not necessarily spherical.

In order to have the same degree of precision for the height of the various spheres, the elements are preferably formed simultaneously by photolithography on the second studs.

BRIEF DESCRIPTION OF THE DRAWINGS

The present invention will be better understood with a reading of the description of the embodiment examples given below, which are purely indicative and in no way limiting, with reference to the drawings in appendix, in which:

FIG. 6 is the section AA of FIG. 5, the cap being shown, FIG. 7, 8A, 9, 10A, 10B, 11A and 11B schematically illustrate a process for manufacturing a fibre support which can be used in this invention, FIGS. 12A to 12E schematically illustrate various steps for preparation of a substrate for applying a process in accordance with the invention, FIGS. 13A to 13D schematically illustrate steps for applying this process in accordance with the invention which follow the steps illustrated schematically by FIGS. 12A to 12E.

DETAILED DESCRIPTION OF PARTICULAR MODES OF EMBODIMENT

In the examples of the invention which follow and in order to ensure optical alignment, each optical fibre is positioned and advantageously attached in a housing defined by two bevelled blocks which form a fibre support.

These two blocks are first soldered to an interconnection substrate at the same time as the optical or optoelectronic component which is to be connected to the fibre.

This soldering occurs following a rough prepositioning (error less than or equal to 5 $\mu$m) of the fiber and the component.

The surface tension forces of the solder microspheres in the liquid phase (technique known by document [1]) allows for "horizontal" optical alignment, i.e. making the optical axis of the fibre and the optical axis of the component parallel to each other in the same plane perpendicular to the surface of the substrate. The connection is made on this surface when the surface is plane (or parallel to a planar surface area of the substrate when it includes steps defined by the planar and parallel surface areas which are offset with respect to each other in terms of height.

The "vertical" optical alignment, i.e. making the optical axis of the fibre and the optical axis of the component parallel to each other in the same plane parallel to the surface of the substrate, is controlled by the relative volumes of the microspheres and by the distance separating the two lower edges of the housing, given the diameter of the fibre and of its supporting points in the housing.

Because of such an assembly, the precision of the positioning of the fibre and the component is very important because it becomes a relative precision and not an absolute precision as in the former art. The core of the optical fibre must nonetheless be well referenced with respect to the external cylindrical surface of the optical cladding of the fibre.

Figure 1:
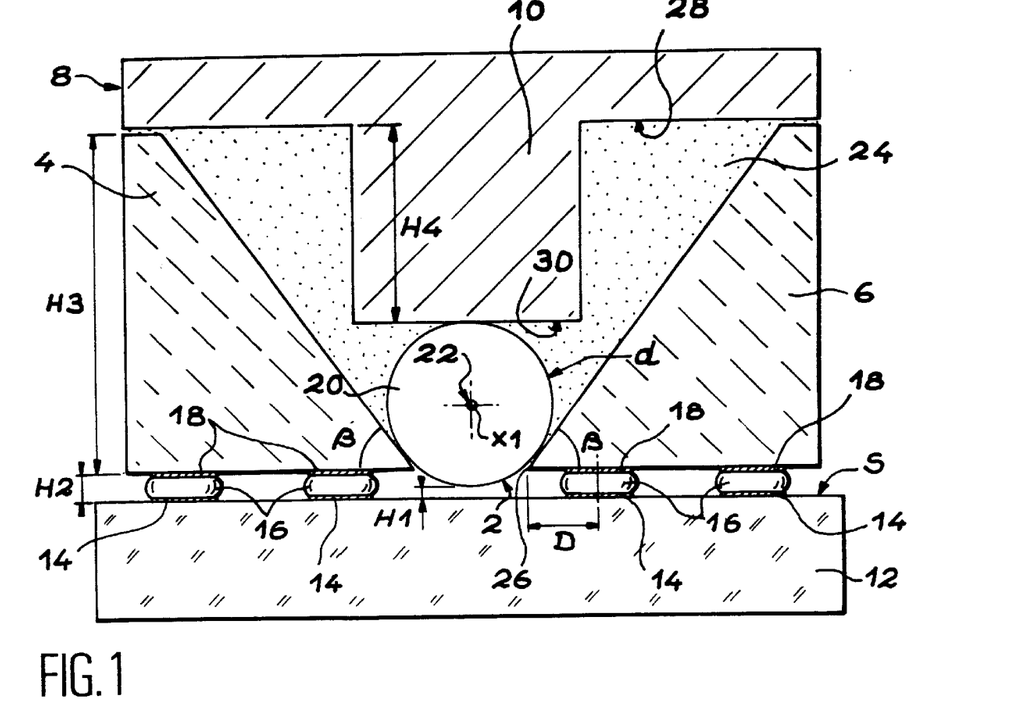
FIG. 1 is a cross-section view of an assembly in accordance with the invention in which an optical fibre is attached onto the thick blocks by a cap containing a protuberance.

FIG. 1 shows an assembly in accordance with the invention between an optical fibre and a component, for example a laser diode (not shown).

The optical fibre 2 is placed on the thick and bevelled blocks 4 and 6 forming a fibre support and a machined cap 8, equipped with a protuberance 10, which attach the fibre against the respective walls of the blocks which form a crossing V when they are seen in the cross section.

There is also an interconnection substrate 12 of which the upper surface S includes attaching studs, generally metallic 14, which are formed by etching on the substrate and on which microspheres of solder 16 have previously been formed. The two bevelled blocks were made for example in a plate of silicon of which the surface was oriented according to the plane (100) by etching according to the preferential crystalline planes with KOH, then metal-plated, to form the attaching studs 18 on the lower sides of the blocks, and freely soldered onto the substrate after positioning of the studs 18 on the microspheres.

In the example shown, the height H3 of the blocks is 250 $\mu$m and the angle $\beta$ of the walls of the V-shaped housing defined by the two blocks, with respect to the surface S of the substrate, is 54.74°.

The positioning of the two blocks for the "horizontal" optical alignment of the fibre and the component occurs automatically by wettability of the solder on the metallic attaching studs 14 and 18 which face each other.

The vertical positioning, i.e. following a direction perpendicular to the surface S, depends on the distance H2 (22

μm in the example shown) between the lower sides of the blocks and the upper surface S of the substrate which is directly linked to the volume of solder and the distance separating the lower edges of the housing, given the diameter of the fiber and of its supporting points in the housing.

For a fiber of a given diameter and a given distance between edges, according to angle β, this fiber will have a variable "vertical" positioning due to the modification of the supporting points.

Likewise, for a given angle β and a given distance between edges, according to the diameter of the fiber, the "vertical" positioning will also be variable. The distance between the edges is determined by the precise positioning of the attaching studs on the blocks.

Knowledge of the distance D between the attaching studs near the edges and the edges themselves, with knowledge of the pitch of the studs made on the substrate, thus allows for determination of the distance between the edges.

The optical fiber 2, of which the optical cladding 20 has, in the example shown, an exterior diameter d of 120 μm (diameter of the fiber) is placed in the V-shaped housing so that the axis X1 of the fiber (axis of the fiber's core 22) is parallel to the upper surface of the substrate. Then the V-shaped housing for example is filed with a glue 24 and the fibre for example is put in contact with the blocks by maintaining pressure on this fibre with the cap until the glue dries.

Because angle β is perfectly known, the final dimension H1 (8 μm in the example shown), the minimum distance between the external surface of the optical cladding 20 and the upper surface S of the substrate, depends as was seen on the precision of the positioning of the attaching studs 18 formed on the lower sides of the blocks and thus the dimension D which is the distance between the lower edge 26 of the block and the axis of the attaching stud 18 closest to this edge and which is for example 50 μm.

In the example shown, the cap is machined or moulded. It can be transparent, in PMMA (polymethylmetacrylate) for example, to verify the quality of the gluing and/or to polymerise the glue by ultraviolet radiation sent through this transparent cap, when this glue can be photopolymerised.

Rather than being made of silicon, the blocks can be made of any other material machined very precisely with a submicronic control of the dimensions.

A large number of microspheres 16 should preferably be placed under the blocks in order to ensure good mechanical resistance during positioning and gluing of the fibre.

The glue may fill the whole volume between the cap and the blocks but it can also overflow under these blocks around the solder microspheres. This reinforces the mechanical resistance of the assembly to prevent any tearing of the fibre during handling of the completed assembly.

The thickness H3 of the bevelled blocks can be varied depending on the application of the assembly. Only the contact area between the fibre and each block is important.

The shape of the cap which holds the fibre against the blocks can also be varied according to the thickness of these blocks (see FIG. 1 and FIGS. 2,3 and 4).

This cap can be made by etching for example of a silicon plate with KOH (case in FIG. 3) or it can be machined or moulded in another material.

In all cases, the cap can advantageously hold each fibre against the blocks.

The dimensions of this cap are not critical except for dimension H4, i.e. the height of the protuberance 10 (FIG. 1), which is the distance between the lower planar wall 28 of the cap and the lower side 30 of this protuberance. This dimension H4 should be sufficient to press against each fiber so that they are maintained in contact with the blocks (see FIG. 1). In the example of FIG. 1, H4≧160 μm is chosen.

In the case of mounting of several fibres parallel with each other (see FIG. 4) the cap is only pressing against the fibres.

With a single fibre, the cap may be pressing against this fibre and one of the two blocks at the same time.

Figure 2:
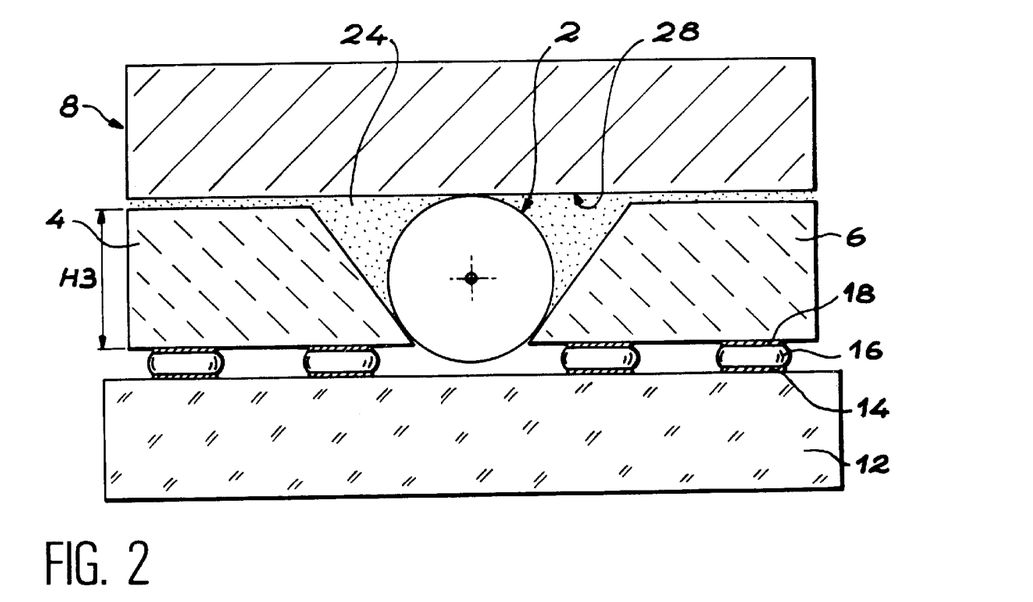
FIG. 2 is a cross-section schematic view of an assembly in accordance with the invention in which an optical fibre is attached onto the thin blocks by a cap with a flat surface.

FIG. 2 shows an assembly in accordance with the invention in which a fibre 2 is held against two thin blocks 4 and 6 with a cap 8 of which the lower side 28 is planar (with no protuberance).

The assembly in FIG. 2 is comparable to that of FIG. 1, but in the case of FIG. 2, the thickness or height H3 of the blocks is less than the diameter d of the fiber (H3 is for example d minus about 20 μm), allowing for use of the cap 8 without protuberance.

Figure 3:
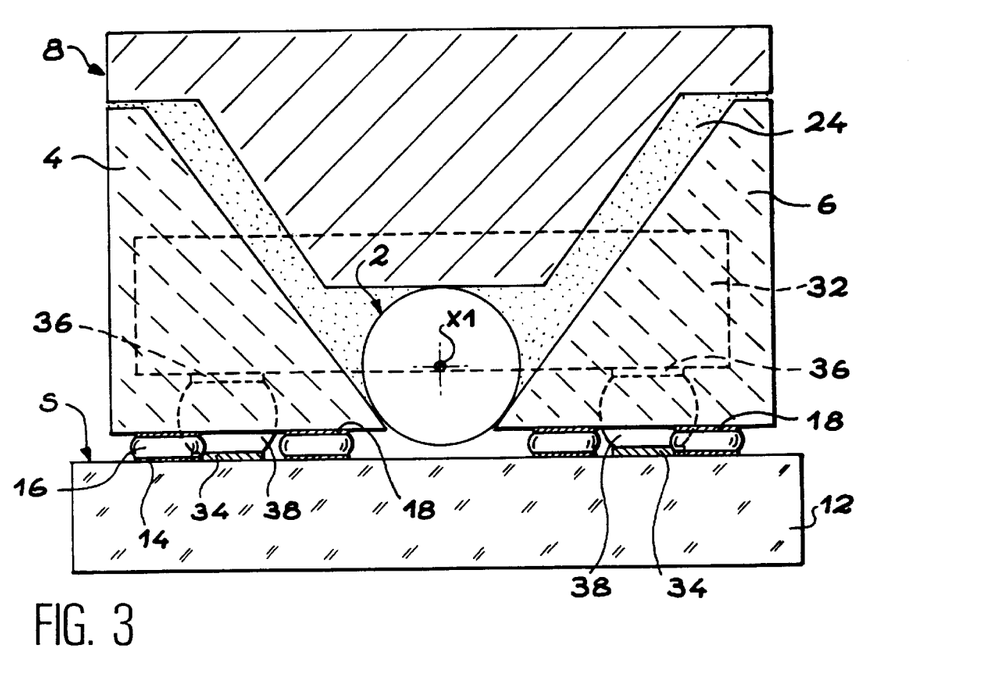
FIG. 3 is a cross-section schematic view of an assembly in accordance with the invention in which an optical fibre is attached to blocks facing a laser diode.

FIG. 3 shows an assembly according to the invention in which an optical fibre 2 is held on the bevelled blocks 4 and 6, facing an optical or optoelectronic component such as for example a laser diode 32, and optically connected to this diode.

FIG. 3 is comparable with FIG. 1. The cap 8 of FIG. 3 simply has a different shape. The laser diode is advantageously soldered onto the substrate 12 at the same time as the blocks. FIG. 3 also shows the attaching studs 34 formed on the substrate 12 and corresponding to this laser diode 32, the attaching studs 36 formed on this laser diode and the microspheres of solder 38 linking the studs 34 respectively to the studs 36. The microspheres 38 being preferably all made on the substrate 12, an overall variation of the height of the solder deposit causes vertical offsetting (i.e. offsetting perpendicular to the upper surface S of the substrate) of the fibre and of the laser diode but the vertical alignment of the optical axis X1 of the fibre and the optical axis of the laser diode is maintained.

Figure 4:
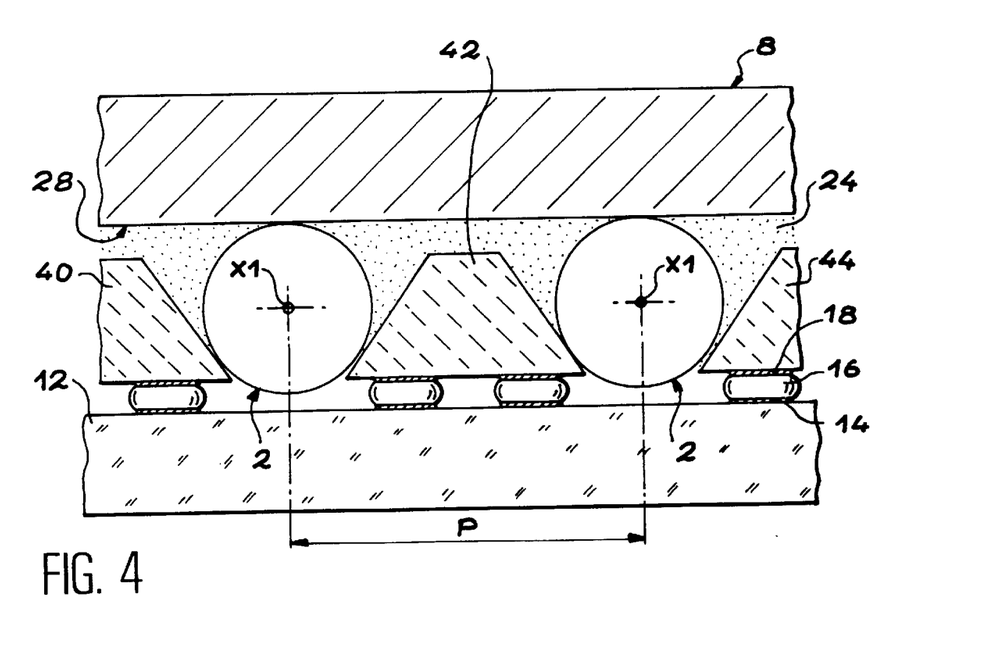
FIG. 4 is a schematic overhead view of an assembly in accordance with the invention in which optical fibres are attached to thin blocks.

FIG. 4 is a schematic view of an assembly in accordance with the invention, including a set of N identical and parallel optical fibers (only two fibers are shown in FIG. 4) on thin blocks 40, 42, 44 (N≧2).

FIG. 4 is comparable to FIG. 2 (the lower side 28 of the cap 8 is planar). The positioning of the optical fibers is shown with a standard pitch (distance between the optical axes X1 of adjacent fibers) P of 250 μm. In this example thin blocks were used. It is then possible to solder for example a bar of N laser diodes (not shown) facing this sheet of optical fibers to connect each fiber to one of the diodes of the bar. In the case of FIG. 4, the support of the fibers includes N+1 blocks among which N−2 are beveled on two opposite sides (see block 42 of FIG. 4).

Figure 5:
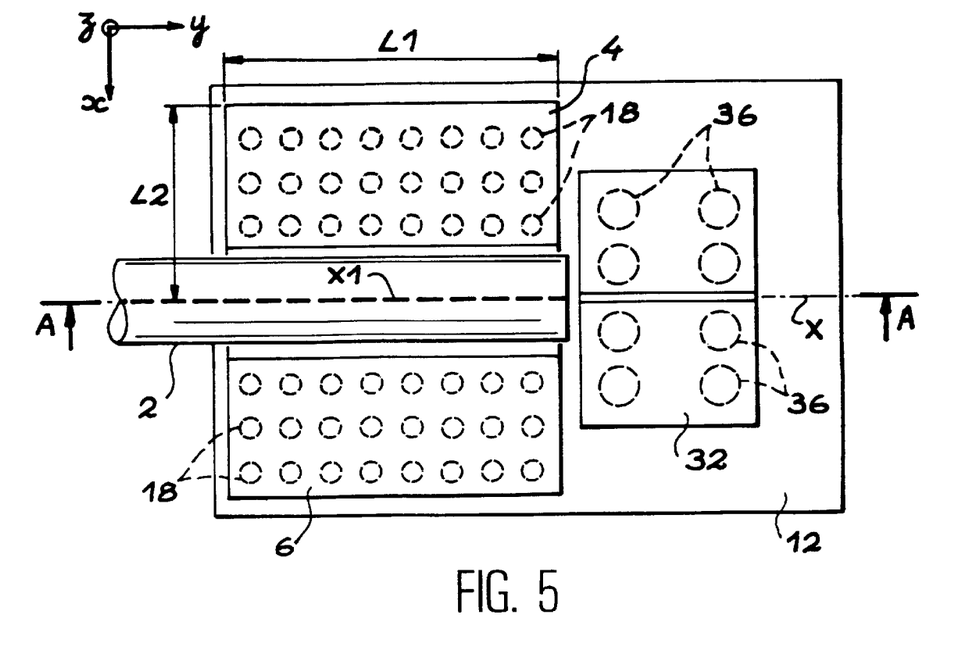
FIG. 5 is a schematic overhead view of an assembly in accordance with the invention in which an optical fibre and a laser diode are optically aligned, the cap allowing for attaching the fibre in the housing defined by the block not being shown.

FIG. 5 is a schematic overhead view of an assembly according to the invention allowing for optical alignment of a optical fibre 2 and a laser diode 32, the cap of this assembly (not shown) holding the fibre against its V-shaped housing formed by two bevelled blocks 4 and 6. FIG. 5 also shows the attaching studs 18 and 36 of the microspheres of solder 16 and 38 respectively on blocks and on the laser diode. The optical axis X1 of the fibre and the optical axis X of the laser diode are the same. The length of the blocks, counted parallel to the optical axis of the fibre, is L1 and is 23 mm in the example shown. The distance between the exterior edge of a block parallel to the fibre and the X1 axis of the fibre is L2 and is 1.5 mm in the example shown.

Figure 6:
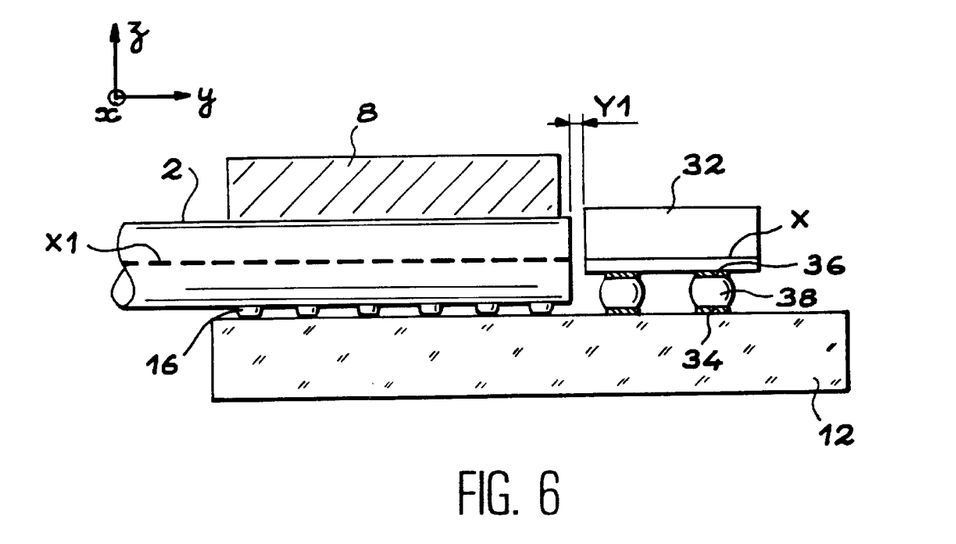

FIG. 6 is the section AA of FIG. 5 (the fibre is not cut) with the cap 8 of the assembly.

The distance Y1 between the side of the fibre and the side of the diode which are facing each other can be adjusted (before fixing of the fibre in its V).

FIG. 7 to 11B schematically illustrate a particular mode of embodiment of a fibre support composed of two blocks.

These two blocks can be made by chemical etching of a silicon plate. Two approaches can be used for this:

either the initial plate is thicker that the depth of the V to be obtained and this plate is then thinned during the making of the blocks, or the initial plate is selected so that its thickness corresponds to this depth of the V (precision on the order of 1 µm) and there is thus no thinning to be done later.

A particular mode of embodiment corresponding to the first case is described below.

A plate of monocrystalline silicon 46 (FIG. 7) is used of which the surface is parallel to the plane (100) and the silicon nitride deposits 48 and 50 are respectively made on the upper and lower sides of this plate. Then photolithography using a layer of photosensitive resin 52 followed by etching of the upper layer 48 allows for elimination of the silicon nitride layer on a strip oriented parallel to the family of planes (100). The unit thus obtained is put into an etching bath composed of hot KOH until formation in the plate 46 of a V-shaped groove 54 according to the planes (111) as seen in FIG. 8A and FIG. 8B which is the enlarged section AA of FIG. 8A.

Figure 9:
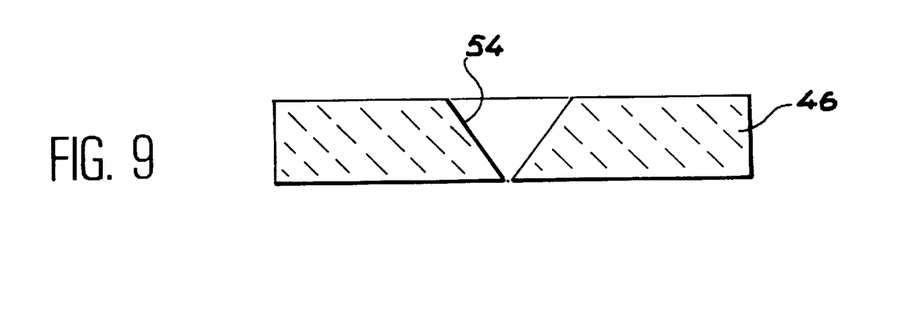
Figure 10:
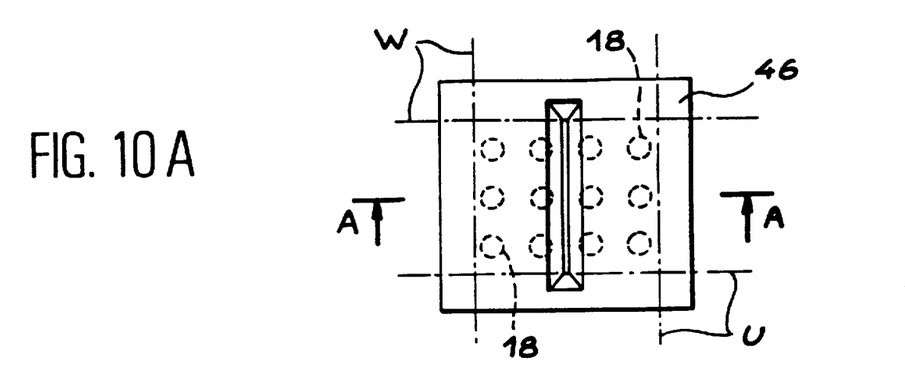
Figure 11:
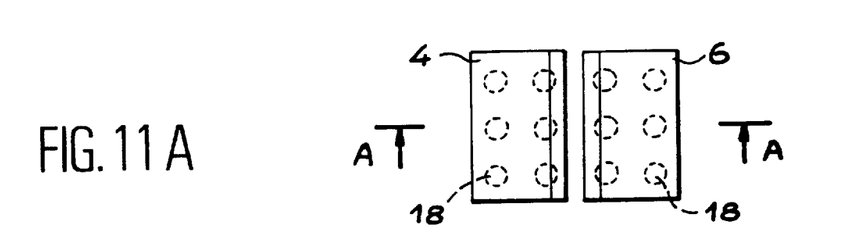

This silicon nitride which acted as a template for the etching of the silicon is then removed (FIG. 9). The plate 46 is thinned on its rear side by mechanical polishing up to the point of the V. This step is critical because it determines the dimension D (see FIG. 1). This mechanical polishing must be stopped very precisely when the line corresponding to the bottom of the V appears. For this, optical detection may be used by illuminating one of the two sides of the plate. The appearance of a strip of light on the opposite side indicates that the polishing is finished. An error in thinning of the blocks of 1 µm leads to a variation in the positioning height of the fiber of 1 µm.

A deposit by for example cathodic evaporation of a layer of metal apt to be soldered, such as two-layer TiNi, is then formed on the rear side of the plate 46. A lithography defining the attaching studs 18 of the microspheres is done and then the metal deposit is etched (see FIG. 10A and FIG. 10B which is the enlarged section AA of FIG. 10A).

This lithography is aligned either with the point of the V of the side of the rear side of the plate 46 or with its front side with very precise double-sided alignment and insulation equipment (offsetting of rear side/front side alignment less than 1 µm). The area of the plate bearing the studs is defined by cut lines U and W provided for this purpose.

Then the two blocks 4 and 6 are separated from each other with a diamond saw (see FIG. 11A and FIG. 11B which is the enlarged section AA of FIG. 11A).

FIG. 12A to 12E schematically illustrate various steps in the preparation of a substrate for forming an assembly according to the invention.

FIGS. 13A to 13D schematically illustrate various steps of a process for assembling an optical fibre and a component in accordance with the invention.

Figure 12A:
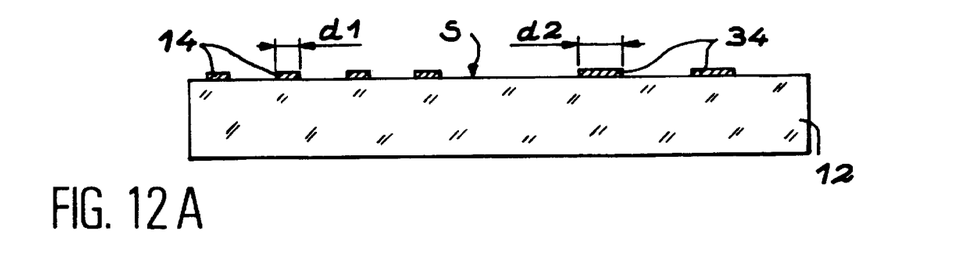
Figure 12B:
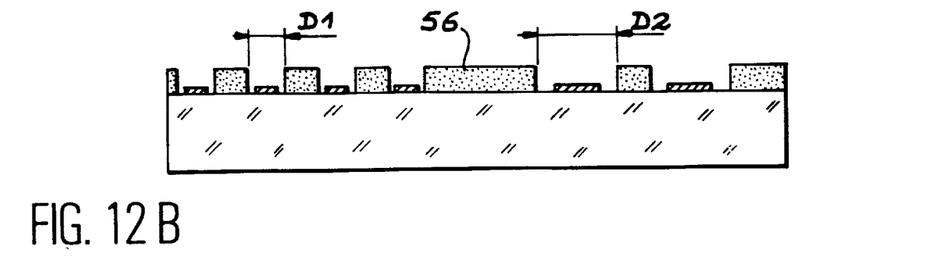

An optical fibre 2 (FIG. 13D) and a component 32 which could be a laser diode for example, are to be optically aligned on the plane surface S of the substrate 12 (FIG. 12A).

Figure 13A:
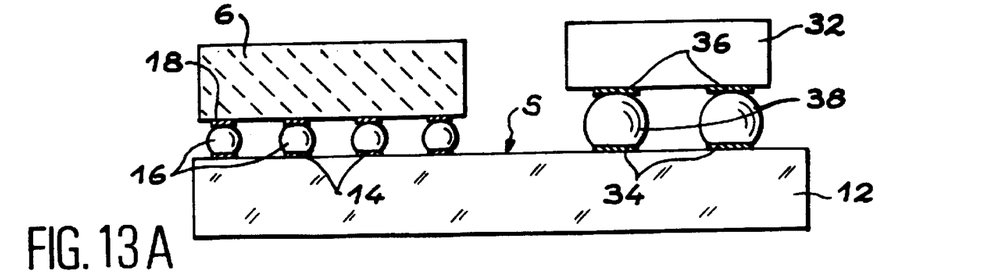

The optical fibre is applied against the V-shaped walls of a housing defined by two blocks (only one of these 6 is shown) by means, for example, of a cap 8 and attached in this housing with glue 24. The blocks are attached to the plane surface of the substrate with microspheres of solder 16. Each microsphere is attached, on one side, to an attaching stud 14 formed on the plane surface S of the substrate 12 and, on the other side, to another attaching stud 18 on the lower surface of the blocks which is located facing this surface of the substrate. Likewise each microsphere of solder 38 of the laser diode 32 is attached, on one side, to an attaching stud 34 formed on the plane surface of the substrate and, on the other side, to another attaching stud 36 formed on the surface of the laser diode which is located facing this plane surface of the substrate. Each of the studs is wettable by the solder of the microspheres whereas the surroundings of the studs are not.

First (FIG. 12A) the attaching studs 14 and 34 which will receive the various microspheres to be formed later are made on the plane surface S of the substrate 12. This can be done with a full section metallic deposit by cathodic evaporation such as TiNiAu followed by photolithography and then etching.

These attaching studs 14 and 34 can be of any shape, for example circular, hexagonal, octagonal or square or even rectangular. For this reason, the microspheres are not necessarily spherical.

In the example shown, these studs are disks of diameter d1 for the studs 14 and disks of diameter d2 for the studs 34.

The dimensions of these studs (diameters d1 and d2 in the example shown), counted parallel to the surface of the substrate, are determined from the desired heights for the microspheres.

In addition, there can be electrical interconnection lines which are integrated in the substrate or located on its surface, to supply electricity (by the studs and microspheres to be formed later) to the laser diode and possibly other components which would need it.

Advantageously, if the interconnection lines (not shown) are arranged on the surface of the substrate, to maintain an identical height for all of the attaching studs for the microspheres, a defined area of material used for these electrical interconnections can be deposited on the attaching studs which are not electrically connected.

A lithography step (FIG. 12B) then allows for definition of the volumes of the microspheres from the circular openings with diameters D1 and D2 respectively, of the photosensitive resin used, the thickness E of the solder chosen and dimensions d1 and d2.

To do this, a layer of photosensitive resin 56 (FIG. 12B) is deposited on the plane surface S of the substrate 12 and this resin is insulated to define the circular openings of diameter D1 (corresponding to the blocks) and the other circular openings of diameter D2 (corresponding to the laser diode).

Meltable material (solder) is then (FIG. 12C) deposited by evaporation for the later formation of the microspheres through openings of diameters D1 and D2 thus obtained until thickness E of the meltable material is obtained in these openings and on the resin layer.

Figure 12C:
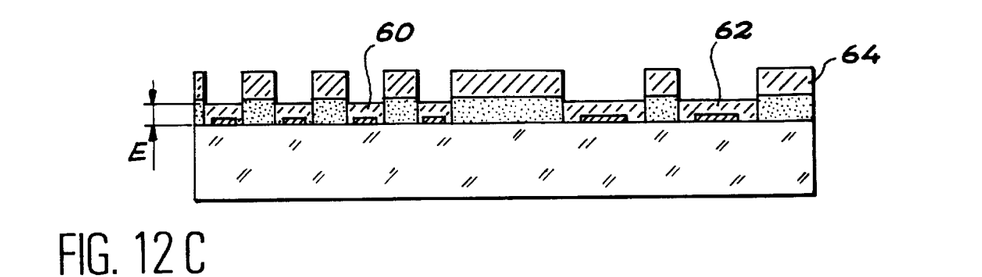

As can be seen in FIG. 12C, disks 60 of solder of diameter D1 are obtained, and disks 62 of solder of diameter D2 respectively formed above studs 14 and 34.

Knowing the thickness E common to the disks 60 and 62, the respective diameters d1 and d2 of the studs 14 and 34 and the respective heights h1 and h2 of the microspheres 16 and 38 to be formed, the diameters D1 and D2 of the openings to be formed in the resin layer can be derived.

Figure 12D:
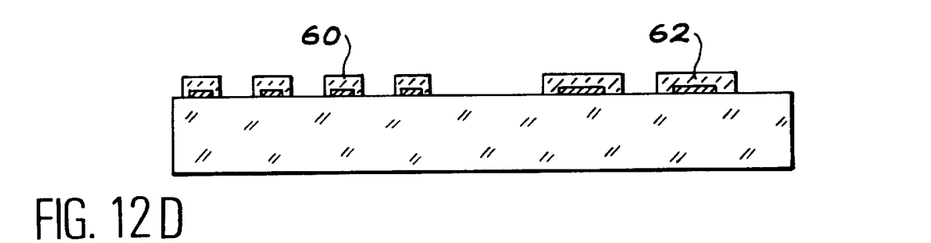
Figure 12E:
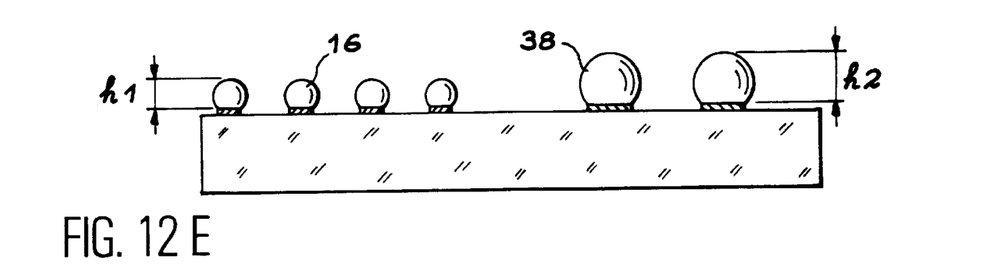

After the solder disks are formed, the resin layer 56 is eliminated by the lift-off technique. The meltable material 64 deposited on this layer 56 is thus eliminated (FIG. 12D).

The temperature of the substrate 12 is then (FIG. 12E) brought above the melting point of the material of disks 60 and 62, thus producing the microspheres 16 and microspheres 38, these microspheres being respectively attached to studs 14 and 34. Then the complete assembly is made.

First (FIG. 13A) the blocks and the leaser diode are hybridized. The blocks and the laser diode are roughly aligned (error of about+/−5μm): the blocks and laser diode are positioned so that their respective attaching studs 18 and 36 lie on the corresponding microspheres 16 and 38.

The temperature of the microspheres is then raised above their melting point.

The blocks and the laser diode can be hybridised with the disks 60 and 62 (FIG. 12D) on which the blocks and the laser diode are appropriately positioned. The temperature of the disks is then raised above their melting point.

Figure 13B:
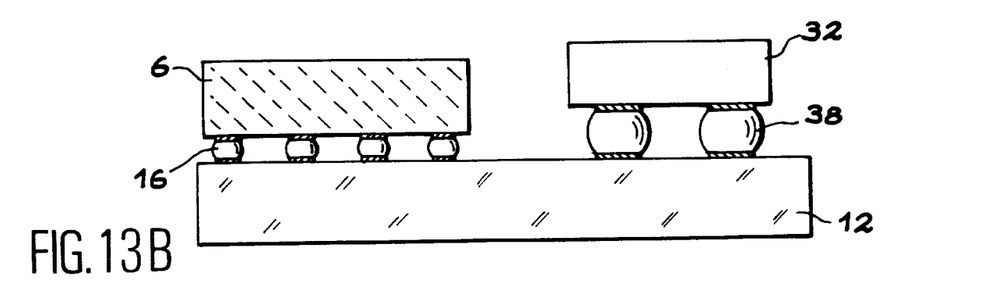
Figure 13C:
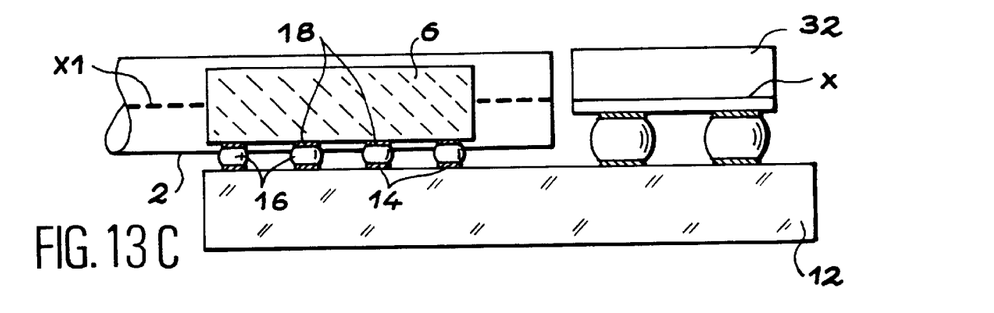
Figure 13D:
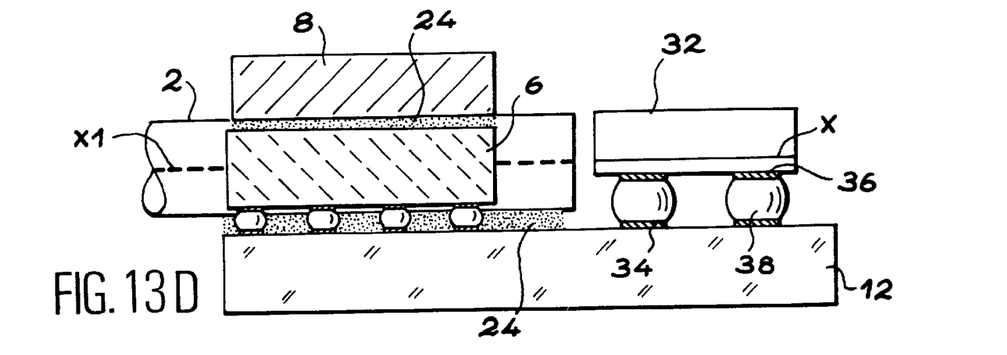

In both cases this gives the structure in FIG. 13B.

The solder is then left to cool to room temperature, producing the hybridisation of the blocks and the laser diode on the substrate.

The optical fibre 2 (FIG. 13C) is then positioned in the V-shaped housing defined by the blocks before or after application of the glue 24 in this housing and then the cap 8 (FIG. 13D) is pressed against the optical fibre during the drying or polymerisation of the glue. In the example shown, the glue is deliberately allowed to run under the blocks to reinforce their mechanical resistance on the substrate. This technique is known in the area of flip chip as the underfill resin technique.

Several parallel fibres and several components can of course be positioned simultaneously using several blocks (FIG. 4) obtained simultaneously by a technique comparable to that which is illustrated by FIGS. 7 to 11B (several parallel V's must then be formed in the silicon plate).

Figure 14:
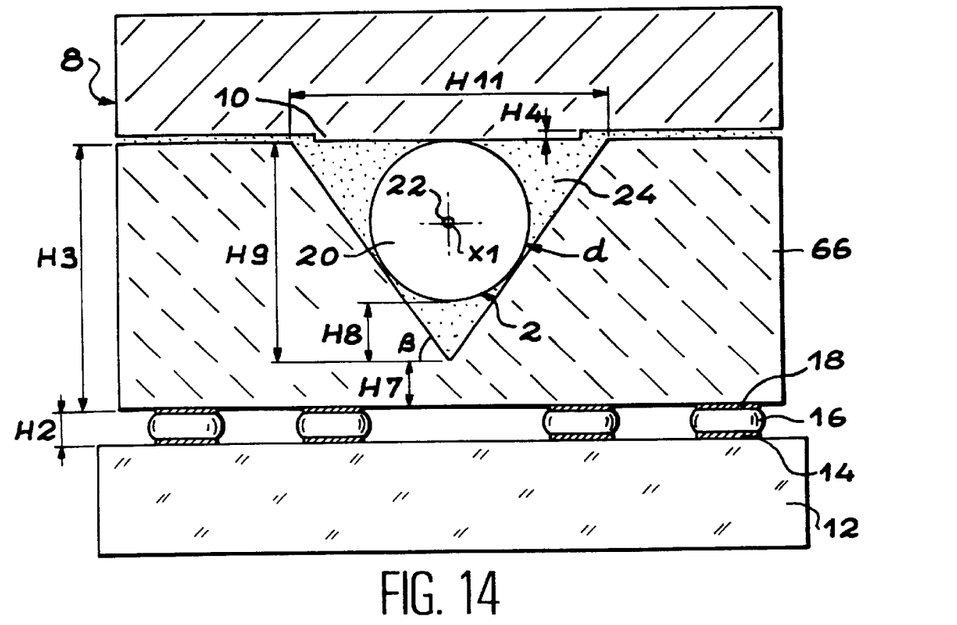
FIG. 14 is a cross-section schematic view of another assembly in accordance with the invention in the case of a "Non-crossing V", and FIGS. 15A, 15B, 16A and 16B schematically illustrate steps of a process for manufacturing a "Non-crossing V" fibre support which can be used in the invention.

FIG. 14 is a schematic view of another assembly according to the invention. This other assembly can be compared with that in FIG. 1 and, on these FIGS. 1 and 14, the same elements have the same references. FIG. 14 illustrates the fact that it is possible to use a support 66 (single block) with a V-shaped housing which is not open at the bottom of the support ("Non-crossing V") to align a fiber 2 facing an optical component (not shown). The block and the optical component are aligned relatively along axis X1. The position of the core of the fiber along axis X1 is precisely known if the dimensions H2 of the solder 16 height, H7 between the bottom of the V and the lower side of the block, H8 between the fiber and the bottom of the V and the diameter d of the fiber are precisely controlled. The dimension H7 depends on the thickness H3 of the block, the opening H11 of the V and the angle β of the walls of the V. The dimension H8 depends on the angle β of the walls of the V and the diameter of the fiber. The critical dimensions for vertical alignment are thus H2, H3, H11, d, and the angle β.

The extra thickness H4 of the cap (protuberance 10) is needed to attach the fiber against the walls of the V if it does not go beyond the surface of the block, i.e. if H8+d≦H9.

This non-exiting block 66 can be grooved with several parallel V's to position several fibres.

A particular mode for making a block with a non-crossing V is explained below.

Figure 7:
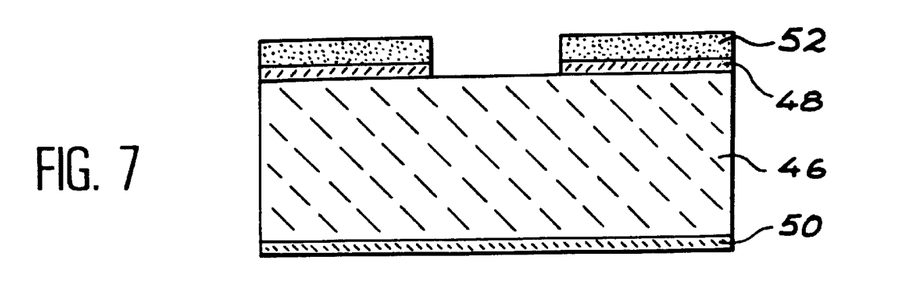
Figure 8A:
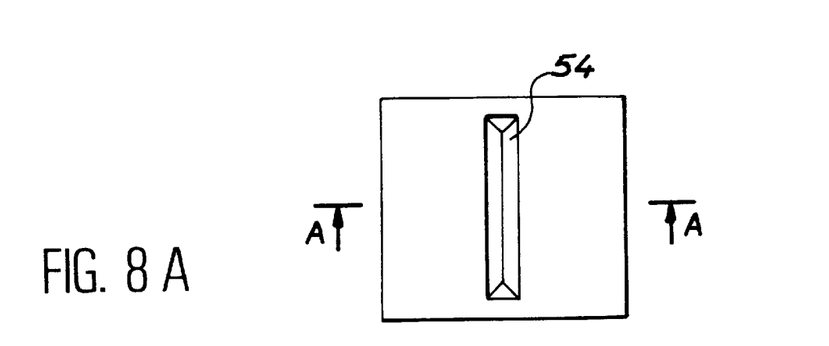
Figure 8B:
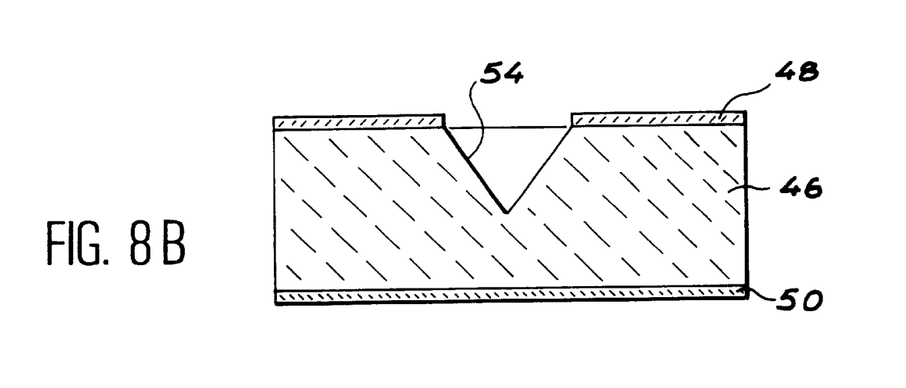

The first steps are those which were described in reference to FIGS. 7, 8A, and 8B: the block can be made by anisotropic chemical etching of a monocrystalline silicon plate of which the thickness is perfectly known. A measurement error of 1 μm of thickness will cause a variation in the height of positioning of the fiber of 1 μm.

A deposit of $Si_3N_4$ is made on both sides of this Imonocrystalline silicon plate of which the surface is parallel to plane (100). Lithography followed by etching removes the $Si_3N_4$ from a strip oriented parallel to the family of planes (100) (FIGS. 7). The unit is then placed in a hot KOH etching bath until formation of a V according to planes (111) (FIGS. 8A and 8B). The $Si_3N_4$ which acted as a template for the etching is then removed.

Figure 15:
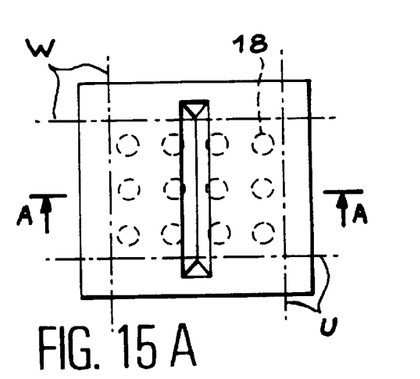
Figure 16:
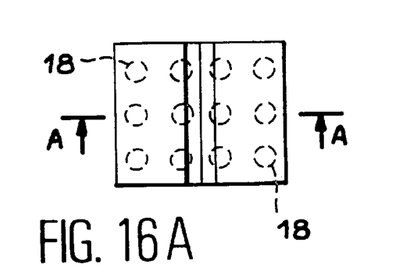

The following steps are illustrated by FIGS. 15A, 15B (enlarged section AA of FIG. 15A), 16A and 16B (enlarged section AA of FIGS. 16A) to be compared respectively to FIGS. 10A, 10B, 11A and 11B, the same elements having the same references: a deposit (by evaporation for example) of a layer of solderable metal (for example a double layer of TiNi) is made on the rear side, then the attaching studs for the spheres are defined by lithography and then the metal is etched. The lithography is aligned on the front side of the plate in order to ensure precise positioning between the studs and the opening of the V, with very precise alignment and double-sided insulation equipment (rear side alignment offset with respect to the front side of less than 1 μm).

The area of the plate with the studs and the "V" along the cut lines U and W for the block (FIGS. 16A and 16B) are then sawed.

Various advantages of this invention are indicated below.
1) The component and the fiber do not have to be precisely aligned parallel to the plane of the substrate. There is auto alignment between the block(s) and the component installed by the microsphere technique. The error with such auto-alignment is less than 1 μm parallel to plane x,y of FIGS. 5 and 6.

During the resolidification of the meltable material of the microspheres, the surface tension forces of this molten material and its wettability forces on the metallic attaching studs allow for auto-alignment on the substrate. The axis of each attaching stud on the substrate is the same as the axis of the corresponding stud located on a block or on the component.

The precision of the alignment of the block(s) and of the component with respect to each other in a plane parallel to the substrate depends only on the precision of alignment of the attaching studs of the microspheres on the side of the component and the block(s) with respect to the optical axes. As this alignment is preferably obtained by photolithography, the resulting error can easily be kept below 0.3 μm with the equipment used in microelectronics.

The same is true for the positioning of the attaching studs on the blocks with respect to the edges of the bevels (dimension D of FIG. 1).

On the substrate side, the studs which receive the microspheres of the block(s) and the component being preferably made simultaneously, the relative error between studs is almost zero (ignoring thermal dilation).
2) The precision of vertical alignment of the fibre on the block(s) and the optical or optoelectronic component is very good because it is relative, unlike the precision of alignment of a component facing a fibre placed in the V of a substrate which must be absolute.

This remark is very important because, due to the present invention, it is no longer necessary to perfectly control the volume of the microspheres to vertically align the elements with respect to each other.

A positive or negative fluctuation of the thickness of the solder deposited with respect to its nominal value leads to a fluctuation in the same direction, with respect to the interconnection substrate, of all of the hybrid elements. The relative movement is very weak, thus ensuring good relative alignment of the elements with respect to each other.
3) As the microspheres are preferably made simultaneously on the interconnection substrate and the thickness of the solder deposited is essentially constant, the respective volumes desired for the microspheres are reached by the adapted diameters of the solder disks.

4) The making of V-shaped wedges in an interconnection substrate by deep etching is no longer necessary. This step is critical on a substrate which includes the metallic and dielectric level needed for electrical connections between optoelectronic components.

5) It is no longer necessary to form alignment blocks in or on the optical or optoelectronic component.

6) The substrate no longer has to be perfectly-aligned monocrystalline silicon.

7) The blocks can be made of silicon and bevelled by etching with KOH. In this case, a large number of blocks can be obtained on the same plate of silicon. But the blocks can also be formed in a material other than silicon.

If the blocks are defective, the resulting additional cost is low given the limited number of steps to form the blocks.

8) The repair of an assembly is easy because the alignment can be measured in optical functioning before the gluing and it is therefore possible to "desolder" the blocks and replace them. In the case of a substrate including an integrated housing, a flaw in its making means that the entire substrate must be rejected.

9) The positioning of the fibre with respect to the component along the y axis (FIG. 6) is adjustable until mechanical contact (variation of dimension Y1). This would present a problem for a V-shaped housing integrated in the substrate because the fibre would then touch the inclined side of the end of the housing or wedge.

What is claimed is:

1. Assembly including a substrate (12) and on this substrate at least one optical fibre support (4, 6; 40, 42, 44; 66), at least one optical fibre (2) in the support and at least one optical or optoelectronic component (32), the optical axis of the fibre and the optical axis of the component being aligned, this assembly being characterised in that the support and the component are attached to the substrate by microspheres (16, 38) of meltable material, allowing the optical axis (X1) of the fibre and the optical axis (X) of the component to be parallel to each other in the same plane perpendicular to a surface of the substrate, and in that the support includes, for each fibre, a V-shaped housing with two walls inclined towards each other, the opening of the V being located on the side of the support which is not attached to the substrate, and in that the fibre is positioned, in the housing, the volume of each microsphere and the housing being determined so that the optical axis of the fibre and the optical axis of the component are parallel to each other in the same plane parallel to the surface of the substrate.

2. Assembly according to claim 1, in which the housing crosses the whole support (4, 6), the housing thus having two lower edges, the distance separating these two lower edges being determined, given the diameter of the fibre and its supporting points in the housing, so that the optical axis of the fibre and the optical axis of the component are parallel to each other in the same plane parallel to the surface of the substrate.

3. Assembly according to claim 1, in which the housing does not cross the support (66).

4. Process for manufacturing an assembly including a substrate (12) and, on this substrate, at least one optical fiber support (4, 6, 40, 42, 44, 66), at least one optical fiber (2) in the support and at least one optical or optoelectronic component (32), the optical axis of the fiber and the optical axis of the component being aligned, this process being characterized in that the fiber support is formed, said support including, for each fiber, a V-shaped housing with two walls inclined towards each other the opening of the "V" being located on the side of the support which is not attached to the substrate, and also including a plurality of first attaching studs (18), and in that a plurality of first attaching studs (36) are also formed on the component, in that the second attaching studs (14, 34) are formed on the substrate, these second studs being respectively associated with the first studs, in that there are formed on these first studs and/or second studs, elements (60, 62) made of a meltable material apt to be soldered to the first and second studs, these first and second studs being wettable by this material in the molten state while their environment is not, in that the support and the component are attached to the substrate by the corresponding elements, these elements being melted for this purpose and allowing the optical axis (X1) of the fiber and the optical axis (X) of the component to be parallel to each other in the same plane perpendicular to a surface of the substrate, and in that the fiber is positioned in the housing, the volume of each element and the housing being determined so that the optical axis of the fiber and the optical axis of the component are parallel to each other in the same plane parallel to the surface of the substrate.

5. Process according to claim 4, in which the housing crosses the whole support, the housing thus having two lower edges, the distance separating these two lower edges being determined, given the diameter of the fibre and its supporting points in the housing, so that the optical axis of the fibre and the optical axis of the component are parallel to each other in the same plane parallel to the surface of the substrate.

6. Process according to claim 4, in which the housing does not cross the support.

7. process according to claim 4, in which the support (40, 42, 44) includes a plurality of parallel v-shaped housings and in that a plurality of optical fibers (2) are respectively positioned in these housings.

8. Process according to claim 4, in which each fibre (2) is attached with glue (24) in the corresponding housing.

9. Process according to claim 8, in which the glue (24) spreads between the support (4, 6) and the substrate (12) around the meltable material elements arranged on the support.

10. Process according to claim 4, in which a cap (8) is made which is apt to cover each housing and in which each fibre (2) is pressed against the corresponding housing by means of this cap.

11. Process according to claim 10, in which the cap (8) is transparent.

12. Process according to claim 10, in which the cap includes, for each fibre, a protuberance (10) by which this fibre is pressed against the corresponding housing.

13. Process according to claim 10, in which the cap includes a plane side (28) by which each fibre is pressed against the corresponding housing, the fibre going beyond the side of the support which is not attached to the substrate.

14. Process according to claim 5, in which a support is formed from an outside plate (46) in which at least two V-shaped walls are made by chemical and/or mechanical etching in this plate in order to obtain a determined distance between the two lower edges of each V, the first studs (18) corresponding to the support are formed by a photolithography technique and the two walls of the housing are separated from each other.

15. Process according to claim 14, in which, when the plate is initially too thick, the formation of the support further includes a step of thinning the plate done before or after the etching of the V.

16. Process according to claim 6, in which the support is formed from a plate in which at least two V-shaped walls are made by chemical and/or mechanical etching of this plate and the first studs corresponding to the support are formed by a photolithography technique.

17. Process according to claim 4, in which the first studs (34) corresponding to the component are formed by a photolithography technique.

18. Process according to claim 4, in which the second studs (14, 34) are formed on the substrate (12) by a photolithography technique.

19. Process according to claim 4, in which the elements (60, 62) formed on the second studs all have the same thickness.

20. Process according to claim 19, in which the elements formed on the second studs are brought to a molten state, each element taking the shape of a sphere (16, 38), these elements in the form of spheres are then brought to the solid state and then to the molten state to assemble the component and the support with the substrate.

21. Process according to claim 19, in which the elements (60, 62) are formed simultaneously by photolithography on the second studs.

* * * * *

UNITED STATES PATENT AND TRADEMARK OFFICE
CERTIFICATE OF CORRECTION

PATENT NO.    : 6,435,733 B1                                          Page 1 of 1
DATED         : August 20, 2002
INVENTOR(S)   : Guy Parat et al.

It is certified that error appears in the above-identified patent and that said Letters Patent is hereby corrected as shown below:

<u>Title page, Item [54] and Column 1, lines 1-3,</u>
Please delete "CONNECTING ASSEMBLY OF OPTICAL FIBERS WITH OPTICAL OR OPTOELECTRONIC COMPONENTS", and insert therefor
-- ASSEMBLY ALLOWING FOR CONNECTION OF OPTICAL FIBERS WITH OPTICAL OR OPTOELECTRONIC COMPONENTS & PROCESS FOR MANUFACTURING THIS ASSEMBLY --.
Item [73], please delete "l'Energie", and insert therefor -- L'Energie --.

<u>Column 1,</u>
Line 4, please insert the heading -- DESCRIPTION --.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,435,733 B1
DATED : August 20, 2002
INVENTOR(S) : Guy Parat et al.

It is certified that error appears in the above-identified patent and that said Letters Patent is hereby corrected as shown below:

Column 1,
Line 44, please delete "6", and insert therefor -- 36 --.
Line 50, after "no.", please insert -- 1 --.
Line 50, after "Mar.", please delete "1,".

Column 5,
Line 42, please delete "schematic overhead view", and insert therefor -- cross-section schematic view --.

Column 11,
Lines 66-67, please delete "Imonocrystalline", and insert therefor -- monocrystalline --.

Column 13,
Line 46, please delete "positioned,", and insert therefor -- positioned --.

Column 14,
Line 35, please delete "process", and insert therefor -- Process --.
Line 36, please delete "v-shaped", and insert therefor -- V-shaped --.

Signed and Sealed this

Twenty-seventh Day of January, 2004

JON W. DUDAS
*Acting Director of the United States Patent and Trademark Office*